April 7, 1970  D. A. CAMPBELL ET AL  3,505,613
ZINC OXIDE LASER
Filed Aug. 22, 1966  3 Sheets-Sheet 1
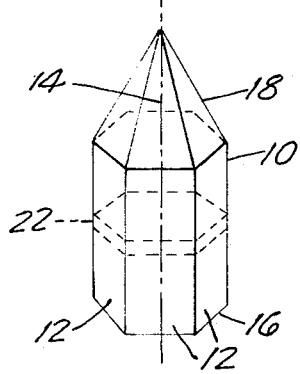
FIG. 1
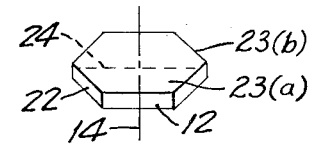
FIG. 2
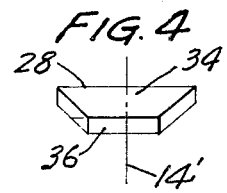
FIG. 4
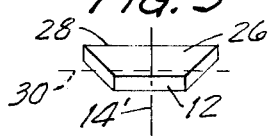
FIG. 3
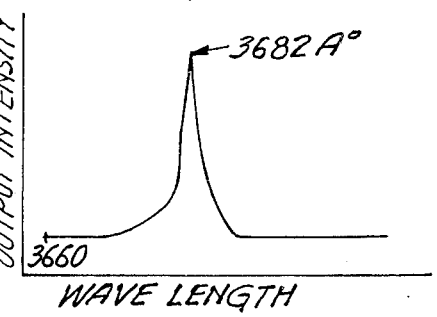
INVENTORS
DONALD A. CAMPBELL
WILLIAM C. TAIT
JAMES R. PACKARD
BY Carpenter, Kinney & Coulter
ATTORNEYS INVENTORS
DONALD A. CAMPBELL
WILLIAM C. TAIT
JAMES R. PACKARD
BY Carpenter, Kinney & Boulter
ATTORNEYS April 7, 1970   D. A. CAMPBELL ET AL   3,505,613
ZINC OXIDE LASER Filed Aug. 22, 1966   3 Sheets-Sheet 3

INVENTORS
DONALD A. CAMPBELL
WILLIAM C. TAIT
JAMES R. PACKARD

BY *Carpenter, Kinney & Coulter*
ATTORNEYS

United States Patent Office

3,505,613
Patented Apr. 7, 1970

3,505,613
ZINC OXIDE LASER
Donald A. Campbell, St. Paul, William C. Tait, Bay Township, Washington County, and James R. Packard, St. Paul, Minn., assignors to Minnesota Mining and Manufacturing Company, St. Paul, Minn., a corporation of Delaware
Filed Aug. 22, 1966, Ser. No. 574,153
Int. Cl. H01s 3/06, 3/09, 3/16
U.S. Cl. 331—94.5                      13 Claims

ABSTRACT OF THE DISCLOSURE

A zinc oxide single crystal laser in which the crystal is selected to have a power conversion efficiency of at least $10^{-2}$ percent in its spontaneous emission region of operation.

---

This invention relates to a device for producing electromagnetic radiation and more particularly to a device for producing electromagnetic radiation from a zinc oxide single crystal by exciting the crystal with a source of energy.

This invention is based upon the discovery that a zinc oxide single crystal having a preselected power conversion efficiency can be excited into stimulated emission by a source of energy of at least a predetermined incident intensity.

The possibility of achieving laser action in zinc oxide has been considered theoretically and attempted for several years. An attempt to excite zinc oxide into laser emission was reported by C. E. Hurwitz in a paper entitled "Electron-Beam-Pumped Semiconductor Fluorescence", Solid State Research, 1965, published by the Lincoln Laboratory, Massachusetts Institute of Technology, Lexington, Mass. This paper noted that no stimulated emission as evidenced by line narrowing or strong superlinearity of intensity as a function of beam currents was observed in zinc oxide at electron beam current densities up to 5 amps/cm.$^2$ and beam voltages as high as 60 kev.

Based upon the discovery of the present invention, zinc oxide can be excited into stimulated emission as evidenced by both line narrowing and superlinearity of output intensity as a function of electron beam currents below current densities of 5 amps/cm.$^2$ and beam voltages below 60 kev. The electromagnetic radiation from the crystal is produced almost solely by spontaneous emission and the intensity of the produced electromagnetic radiation is directly proportional to source incident intensity when the energy used to excite or pump the crystal is below a predetermined incident intensity. Thus, the region of crystal operation for exciting energies less than the predetermined intensity is referred to as the spontaneous region. It has also been found that the power conversion efficiency of some crystals is so low that, at least for the present state of the art energy sources, they operate in the spontaneous region regardless of the excitation energy.

In a zinc oxide single crystal having at least a sufficient power conversion efficiency whereby stimulated emission can be produced, application to the crystal of an excitation energy within the range from the predetermined incident intensity to a threshold intensity causes the crystal to produce electromagnetic radiation of an intensity which varies superlinearly as a function of the incident intensity. The laser action in this region of superlinearity is referred to as super radiance and the electromagnetic radiation produced in this region is by spontaneous and stimulated emission, with the proportion due to stimulated emission varying from very low at intensities just above the predetermined intensity to very large at intensities approximately equal to the threshold intensity. For crystals of sufficient conversion efficiency the emission line for an incident intensity near threshold exhibited line narrowing when compared to the emission line for an incident intensity near the predetermined intensity.

A further increase in the incident intensity beyond the threshold intensity causes the electro-magnetic radiation to become coherent. The coherent emission is produced by the crystal being in mode oscillations wherein the radiation is forced into one or more standing waves maintained by the stimulated emission within the resonant cavity of the crystal. The coherent electromagnetic radiation appears to become linear as a function of incident intensity. Laser action exhibiting coherent emission is referred to as the mode oscillation region. Electromagnetic radiation in the mode oscillation region is produced almost solely by stimulated emission.

In one embodiment, the present invention utilizes a zinc oxide single crystal which is cooled to a temperature near that of liquid helium, or about 10° K., and an electron beam means for exciting the crystal. In this embodiment, the zinc oxide single crystal produces ultraviolet electromagnetic radiation by stimulated emission wherein the radiation emission spectra contains an emission line having a maximum output intensity occurring at about 3700 angstroms. The emission line exhibits line narrowing. The emission line wavelength of maximum intensity shifts slightly for different current densities. For example, the wavelength of maximum intensity for current densities in the super radiant region was found to be slightly greater than the wavelength of maximum intensity for current densities in the spontaneous region.

If the same zinc oxide crystal of the foregoing embodiment is excited by an electron beam at a temperature between that of liquid helium and liquid nitrogen, or about 50° K., the resulting electromagnetic radiation contains an emission line having a maximum output intensity occurring at a different predetermined wavelength, the emission line clearly exhibits a superlinear dependence on the intensity of the electron beam.

In another experiment, a zinc oxide single crystal was cooled to a temperature near that of liquid nitrogen, or about 77° K., and bombarded with an electron beam having a current density of, variously, from 2 amps/cm.$^2$ to 5 amps/cm.$^2$ ultimately coherent emission. The crystals in the foregoing experiment were in the form of a Fabry-Perot cavity.

The zinc oxide single crystals utilized in the above experiments were selected to have a power conversion efficiency which was at least sufficient to permit operation in the super radiant region when the crystal was bombarded by an electron beam of a predetermined voltage and current density. The term "power conversion efficiency" when used herein is meant to be the ratio between substantially all the electromagnetic radiation power output emitted from one cavity surface and the excitation power incident upon the crystal.

Zinc oxide single crystals having a power conversion efficiency of greater than about $10^{-2}$ percent as measured in the spontaneous emission region were found to be capable of producing electromagnetic radiation in the super radiant and mode oscillation regions.

The primary advantage of the present invention is that ultraviolet radiation is produced from a solid state material, zinc oxide, which material provides inherent advantages over prior ultraviolet lasers such as, for example, pulsed nitrogen gas.

An addition advantage of the present invention is that a bulk zinc oxide single crystal can be fabricated into a resonant cavity having a larger scannable area than other laser crystals such as naturally grown platelets, for example.

These and other advantages of the present invention can be determined by reference to the accompanying description and drawing wherein:

FIGURE 1 is an illustration of a bulk zinc oxide single crystal;

FIGURE 2 is a diagrammatic representation of a crystal wafer sliced from the bulk crystal of FIGURE 1;

FIGURE 3 is a diagrammatic representation of the crystal wafer having a single cleaved surface;

FIGURE 4 is a diagrammatic representation of a single crystal in the form of a Fabry-Perot cavity;

Figure 7A:
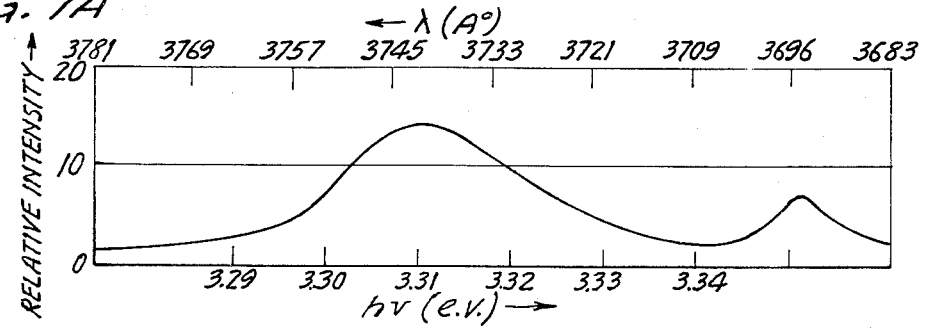
Figure 7B:
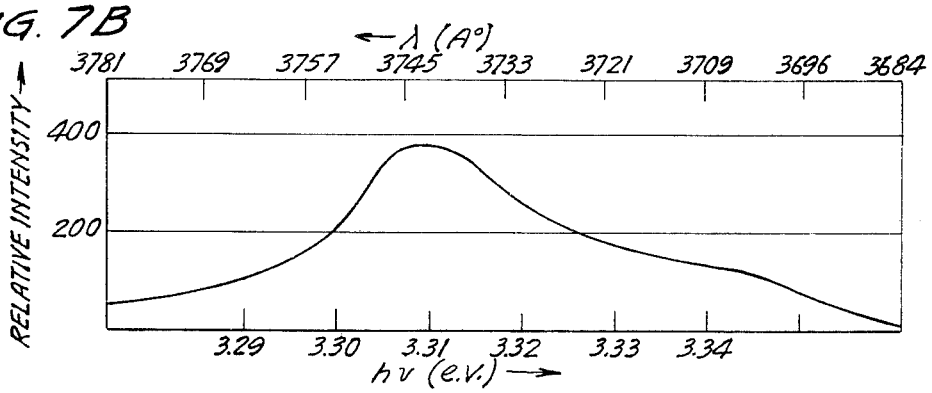
Figure 7C:
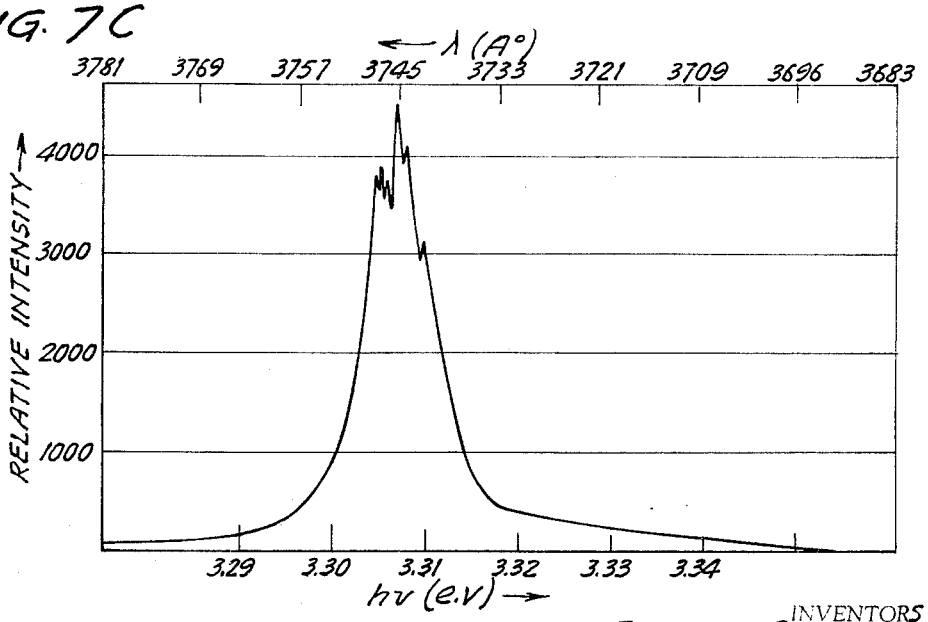
Figure 8:
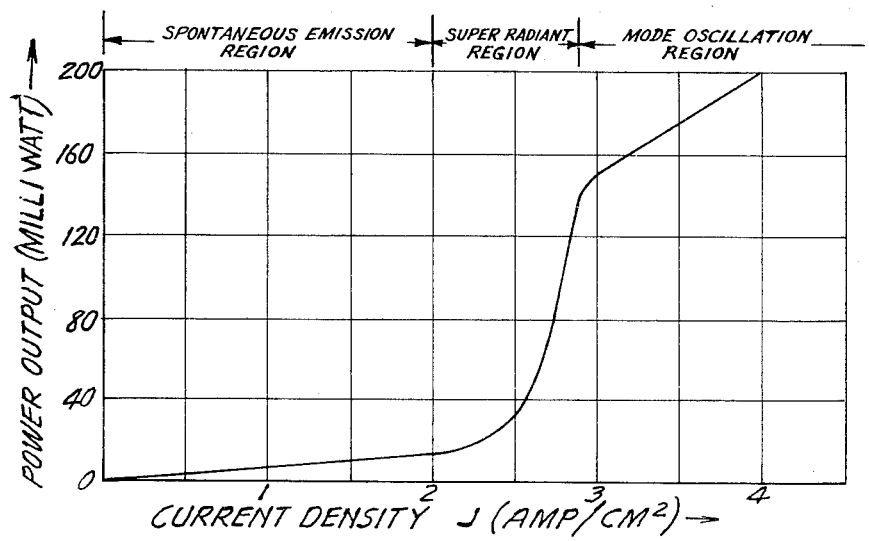
Figure 9:
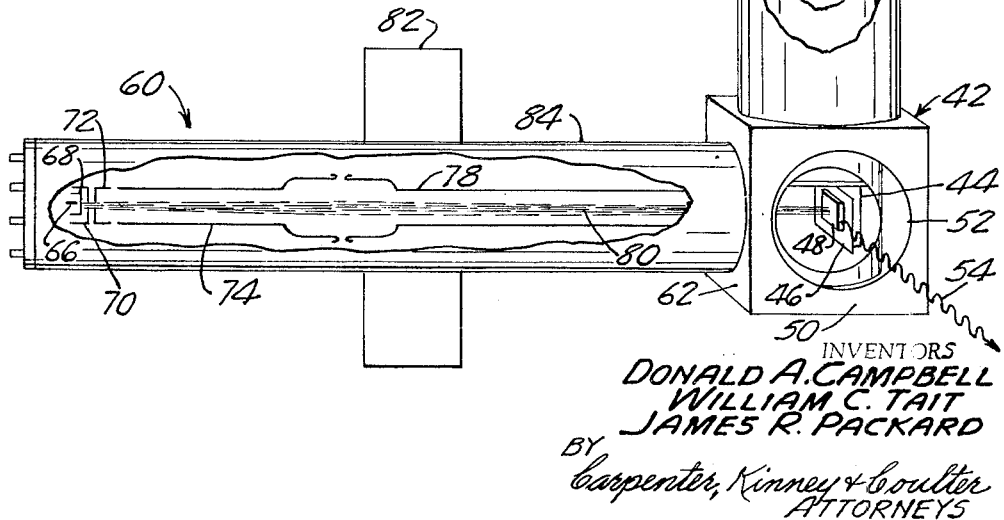

FIGURES 5A and 5B are graphic representations of the emission spectra of electromagnetic radiation from a zinc oxide crystal at a temperature of about 10° K. and for electron beam current densities of less than 1 amp/cm.$^2$ and approximately 1 amp/cm.$^2$, respectively, illustrating line narrowing;

FIGURES 6A, 6B, 6C and 6D are graphic representations of the temporal character of electromagnetic radiation from a zinc oxide single crystal at two values of beam current illustrating superlinearity;

FIGURES 7A, 7B and 7C are graphic representations of the emission spectra of a single zinc oxide crystal at a temperature near that of liquid nitrogen pumped by an electron beam having an intensity which is, respectively, in the spontaneous region, the super radiance region and the mode oscillation region;

FIGURE 8 is a graph illustrating a waveform which represents the power output from a crystal as a function of current density of an exciting electron beam; and FIGURE 9 is a diagrammatic representation of apparatus for producing coherent electromagnetic radiation by stimulated emission of a zinc oxide single crystal with an electron beam.

Referring now to FIGURE 1, the crystal utilized in this invention is a bulk zinc oxide single crystal having a low level of impurities as measured in parts per million, for example less than one part per million. A zinc oxide single crystal utilized in this invention was grown by known vapor growing techniques. The resulting crystal was hexagonal in cross-section and had an overall length of about five centimeters and a diameter of about five millimeters. In FIGURE 1, a typical crystal 10 has six natural crystal faces 12 around the periphery thereof. The crystal 10 is considered to have a c-axis 14 which extends from the base 16 axially through the crystal and subsequently through the top 18, which top 18 is generally in the form of a prismatic cone.

A wafer, referred to as 22, of the zinc oxide crystal can be carved or sliced from the bulk crystal 10 using conventional techniques. For example, the wafer 22 can be sliced from the bulk of the crystal 10 at any point below top 18.

FIGURE 2 depicts a wafer 22 which has been sliced from the crystal 10 with the cut being preferably made such that major surfaces 23(a) and 23(b) of the wafer are normal to the wafer natural crystal surfaces 12. Wafer 22 is hexagonal in cross-section having the c-axis thereof extending axially therethrough. The zinc oxide single wafer crystal 22 may be of about one millimeter thickness extending in an axial direction parallel to the c-axis with a diameter of about five millimeters which corresponds to the overall diameter of crystal 10.

One major surface of the zinc oxide single crystal wafer 22 of FIGURE 2 is then mechanically polished after first being attached to a glass support by means of an adhesive such as Canada balsam.

In one preparation method, the wafer 22 is initially polished, for example, by 600-grit sandpaper until the axial thickness of the wafer 22 is about 100 microns. The wafer 22 may be then polished utilizing three-micron diamond dust supported in a nylon backing until the crystal is water clear. Finally the wafer 22 is polished on a water-covered micro-cloth having a .05-micron aluminum oxide powder as the abrasive member until the exposed wafer 22 major surface is polished down to a relatively smooth optically flat surface. Thereafter, the wafer 22 may be washed with water to remove any residue which may be clinging to the surface thereof from the polishing step.

As an alternative process of preparing the wafer, one would again begin with the wafer 22 of FIGURE 2. Initially, the wafer 22 would be chemically polished by attaching the wafer 22 to a glass support and rubbing it on a cloth containing a polishing solution of approximately one percent bromine in methanol at room temperature. The rate of polishing action can be increased by increasing the percentages of bromine up to about ten percent. Above ten percent, the crystal surface is etched rather than polished. It is preferable to have the percentage of bromine be less than one percent.

The crystal is polished in this way for about one minute. The wafer 22 is then washed in water to remove the polishing solution. The side that has been polished by the solution is further polished with 600-grit sandpaper down to an axial thickness of about 75 microns. The crystal wafer 22 is further polished by a three-micron diamond paste supported by a nylon backing until the polished side of the wafer 22 is water clear. Lastly, the crystal is polished with a micro-cloth, having .05-micron aluminum oxide powder thereon. The crystal 22 is washed in water to remove the residue from the micro cloth polishing. The wafer is again chemically polished with a cloth containing a polishing solution of about one percent bromine in methanol at room temperature for several minutes or until the wafer 22 is about 50 microns in thickness.

After the wafer 22 has been prepared by either method, it is cleaved. The cleaving is accomplished under a microscope by means of a razor blade which is used as the means for imparting a separating force to cause the atoms to split to form a cleaved face on the crystal. In FIGURE 2, the crystal wafer 22 is cleaved along a line illustrated as dashed line 24 producing a cleaved surface which is parallel to one of the natural crystal faces 12.

FIGURE 3 depicts a wafer section 26 having a first cleaved surface 28 which is parallel to the natural crystal face 12. The wafer section 26 is cleaved a second time producing a second cleaved surface which is parallel to both the first cleaved surface 28 and face 12. The second cleaved face would be done along a line illustrated by dashed line 30 of FIGURE 3. The thickness of the wafer section extends in a direction indicated by line 14′ which is parallel to the c-axis. Hereinafter, reference to the c-axis direction includes lines 14 and 14′.

A cleaved zinc oxide single crystal 34 is illustrated in FIGURE 4. The zinc oxide single crystal 34 has a first cleaved surface 28 and a second cleaved surface 36, each of which is substantially parallel to each other. The crystal 34 would have a thickness of about 50 microns in a direction which is parallel to the c-axis, as indicated by line 14′, and a width between the cleaved surfaces 28 and 36 of about 500 microns.

Referring now to the graphs of FIGURES 5A and 5B, the graphs illustrate, as a waveform, output emission intensity from a zinc oxide crystal versus wavelength from just below to just above the boundaries of the super radiant region. The zinc oxide crystal was mechanically polished and cleaved as described in the first preparation thereby forming a cavity generally referred to as a Fabry-Perot cavity. The cleaved faces of the crystal 34 were coated with aluminum to enhance photon reflection. The resulting emission at an ambient temperature near that of liquid helium, or about 10° K. was in the ultraviolet spectrum. The crystal was bombarded by an electron beam in the form of pulses having a voltage of about 30 kev, with a beam current density of about 1 ampere/cm.² The pumping pulse repetition rate was about 20 pulses per second and each pulse has a duration of about two microseconds. The output intensity from the crystal 34 was found to be at a maximum at about 3690 angstroms.

FIGURE 5A illustrates the emission spectrum of the ultraviolet radiation emitted by a zinc oxide single crystal at a temperature near that of liquid helium when the crystal was pumped by an electron beam having a current which was insufficient to cause stimulated emission. The electron beam current was less than 1 amp/cm.² and, upon sweeping the output intensity at the rate of 1,000 anstroms per 60 seconds with a monochromator grating, an emission line having a maximum output intensity was found to occur at about 3692 anstroms. The half width of the emission line (the width between the two points on the emission line where the intensity is equal to one half of the peak output intensity) was about 8.4 angstroms. FIGURE 5B illustrates the emission spectrum emitted from the same zinc oxide single crystal at the same temperature when the crystal was pumped by an electron beam having a current which was sufficient to cause stimulated emission. The electron beam current was increased to about 1 amp/cm.², and upon sweeping the output intensity in the same manner as described, the output intensity was found to peak at about 3682 angstroms. The emission line of the radiation peaked at a higher maximum output intensity. The emission line exhibited line narrowing wherein the half width of the emission line was found to be 4.2 angstroms.

A different zinc oxide single crystal, prepared by the same mechanical polishing and cleaving procedure as described hereinbefore, was heated to about 1100° C. for four days. Thereafter the crystal was cooled down to about 22° K. and then slowly increased in temperature to about 50° K. When the zinc oxide single crystal was bombarded with an electron beam having a voltage of about 30 kev. and a peak current of about three milliamps, the maximum output intensity occurred at about 3750 angstroms. The beam current density was varied and the corresponding change in the output intensity of the crystal observed. Examples of the output intensity change in response to a beam current density change are shown in FIGURES 6A–6D. The graph of FIGURE 6A illustrates a waveform depicting the crystal radiation output as a function of time in response to a beam current having characteristics depicted by the waveform of FIGURE 6B.

When the beam current was increased to a peak current of about six milliamps, the output intensity from the zinc oxide single crystal abruptly and sharply increased. The output intensity of the emission line exhibited a superlinear dependence on the excitation current. The waveform of FIGURE 6C depicts the emission line exhibiting superlinearity and a substantially higher maximum output intensity as a function of time in response to a slightly increased beam current having a waveform illustrated in FIGURE 6D. The power conversion efficiency of this crystal was measured to be about $10^{-2}$ percent in the spontaneous emission region.

FIGURE 7 views A, B, and C shows the emission spectra of another crystal for beam current densities of 0.09 amps/cm.², 2.9 amps/cm.², and 4 amps/cm.², respectively. A zinc oxide single crystal, mechanically and chemically polished and cleaved as described in the alternate preparation procedure, was cooled to a temperature near that of liquid nitrogen, or about 77° K. The crystal was bombarded with an electron beam having a variety of current densities at about 50 kev. In one instance, the crystal was bombarded with an electron beam having a current density of 0.09 amps/cm.², which was well below the predetermined intensity needed for stimulated emission. The zinc oxide single crystal exhibited only spontaneous emission. The graph of FIGURE 7A illustrates the waveform of output intensity versus wavelength for the crystal in the spontaneous region. From the waveform of FIGURE 7A, the emission spectra contains an emission line which peaks at about 3740 angstroms and at a relative intensity level of about 15.

When the electron beam current density was increased to a point just below threshold, about 2.9 amps/cm.², the zinc oxide single crystal exhibited super radiance. The emission line had a half width of about 30 angstroms and was superlinear as a function of the exciting beam. For purposes of comparison, the output intensity level of the electromagnetic radiation at a point just below threshold in FIGURE 7B is about 360 on the same relative scale used in FIGURE 7A.

When the electron beam current density was above threshold, for example about 4 amps/cm.², the zinc oxide single crystal emitted coherent radiation. This coherent radiation was detected by placing a phosphor sheet into the radiation path whereupon the phosphor, upon being bombarded by the electromagnetic radiation, produced visible light. It was found that the light had a substantial portion thereof confined in a cone of about 10° thereby giving evidence of coherent emission. Further, a camera was positioned in the radiation path and a picture thereof was taken using photographic film thereby recording the coherent light. The graph of FIGURE 7C illustrates the waveform of the electro-magnetic radiation produced by the crystal, when the current density was about 4 amps/cm.². The radiation exhibited an emission line having a maximum output intensity occurring at about 3745 angstroms and had an intensity in excess of 4000 based on the same relative scale as for FIGURE 7A. Additionally, comparison of views 7A, 7B and 7C shows that the emission line clearly exhibited line narrowing.

From a comparison of the waveforms in FIGURES 7A, 7B and 7C, it appears that zinc oxide, when excited by an electron beam at a temperature near that of liquid nitrogen, exhibits line narrowing and coherent emission when excited into the mode oscillation region.

Superlinearity is more clearly noted by referring to the graph of FIGURE 8 which ilustrates the power output in milliwatts versus the current density of the electron beam in amps per square centimeter. The region of the curve below a power output of about 12 milliwatts, which occurs at about 2 amps/cm.², is the spontaneous emission region. It is within the spontaneous region that the power output is linear, that is, the power increases in proportion to the incident intensity of the electron beam.

The region of the curve located above the spontaneous region and below the power output of about 150 milliwatts, which occurs at about 3 amps/cm.², is the super radiance region. Within this region, the power output is superlinear, that is, the power increases nonlinearly with respect to the incident intensity of the electron beam.

The portion of the curve located above the super radiance region is the mode oscillation region. When in the mode oscillation region, the crystal produces coherent emission, when a crystal has been excited into mode oscillations, the power output appears to be linearly proportional to the current density of the electron beam.

FIGURE 9 illustrates the apparatus which may be used for producing the zinc oxide laser of this invention. Briefly, the laser apparatus comprises a cryostat tail section 40 containing a liquid refrigerent such as the liquid nitrogen or liquid helium which is ultimately used as the means for cooling the zinc oxide crystal to a predetermined ambient temperature. The cryostat 40 may be, for example, an optical access tail section for a standard helium cryostat.

A cubical block housing member 42, which is about two inches on each side and constructed of nonmagnetic stainless steel, has a hollowed-out interior. The member 42 has an opening in one side which receives the cryostat tail section 40. Inside the interior of member 42, the tail section 40 terminates in a cold finger 44 to which is attached copper holder 46. The copper holder 46 has the cleaved zinc oxide single crystal 48 attached thereto by means of an adhesive such as vacuum grease. The member 42 has, on an adjacent side 50, a quartz window 52 which is about one inch in diameter. The quartz window 52 allows the radiation from crystal 48 to exit from the member 42.

In this embodiment, the $c$-axis of the crystal is positioned parallel to the face of quartz window 53 such that when the crystal is excited into stimulated emission the electro-magnetic radiation, illustrated as arrow 54, is emitted out of member 42 via the quartz window 52. The radiation 54 is detected by means of a photodetector (not shown) such as an RCA type 929.

Means for generating an energy beam such as an electron gun 60 is secured to the block housing 42 on a side 62, which side is adjacent to the side 50 containing the quartz window 52. The electron gun 60 may be, for example, a gun assembly replacement for a type 7NP4 tube. The electron gun 60 includes a separate filament 66 which heats an indirectly-heated cathode 68. The electrons emitted by cathode 68 are controlled by means of a first grid 70 and an accelerating grid 72. A focusing grid 74 focuses the accelerated electrons and an anode 78 accelerates the focused electron beam 80 onto the exposed major surface of crystal 48. A means for deflecting and scanning the electron beam, such as a deflection coil 82, is positioned about an electron gun housing 84 in axial alignment with the electron beam 80. The resulting electron beam can have a potential of about 50 kev. and a current density in the order of 4 amps/cm.$^2$ with a beam cross-section of about 500 microns in diameter.

In this embodiment, the $c$-axis of the zinc oxide crystal in parallel to the electron beam 80 whereby radiation is produced in the TE mode. The electric field vector associated with the electromagnetic radiation appears to be perpendicular to the $c$-axis of the crystal.

However, it is contemplated that the zinc oxide crystal can have the electron beam perpendicular to the $c$-axis of the crystal giving radiation in the TM mode, with the electric field vector perpendicular in a direction to the $c$-axis of the crystal.

A zinc oxide laser has wide utility. For example, the ultraviolet radiation produced by the laser can be utilized for a copying machine or as a means for transmitting information in the form of modulated electromagnetic radiation. Such applications are merely exemplary and are not intended to limit the broad scope of this invention.

Having thus described a preferred embodiment of a zinc oxide laser it is understood that modifications thereof are apparent to one having ordinary skill in the art and all such modifications and equivalents thereof are contemplated as being within the scope of the appended claims.

What is claimed is:

1. Apparatus for producing electromagnetic radiation from a crystal comprising:
   a zinc oxide single crystal having a preselected power conversion efficiency, having a pair of opposing cleaved faces which are utilized as reflective surfaces of a cavity and having a pair of major surfaces substantially normal to the cleaved faces; and
   means for exciting the crystal by directing a source of energy at one of the crystal major surfaces to produce electromagnetic radiation from the crystal, the crystal operating in a spontaneous region for excitation energies less than a predetermined intensity, in a super radiant region for excitation energies greater than the predetermined intensity and less than a threshold intensity, and in a mode oscillation region for excitation energies greater than the threshold intensity.

2. The device of claim 1 wherein said means for exciting said crystal is an energy beam and further including
   means for varying the ambient temperature of said crystal.

3. A device for producing electromagnetic radiation by stimulated emission comprising
   a zinc oxide single crystal having a preselected power conversion efficiency and capable of stimulated emission when excited by a source of energy having a predetermined incident intensity, said crystal when excited into stimulated emission producing electromagnetic radiation which exhibits a superlinear dependence on said incident intensity; and
   means for exciting said crystal with a source of energy having at least sufficient incident intensity to excite said crystal into stimulated emission.

4. The device of claim 3 wherein said means for exciting said crystal is an energy beam and said electromagnetic radiation is in the ultraviolet, said device further including
   means for varying the ambient temperature of said crystal.

5. A device for producing electromagnetic radiation by stimulated emission comprising
   a zinc oxide single crystal having a preselected power conversion efficiency of greater than about $10^{-2}$ percent and capable of stimulated emission when excited by a source of energy having a predetermined incident intensity whereby the maximum output intensity of said electromagnetic radiation is dependent upon the amount of stimulated emission produced by said crystal; and
   means for exciting said crystal with a source of energy of at least sufficient incident intensity to excite said crystal into stimulated emission.

6. The device of claim 5 further including
   means for varying the ambient temperature of said crystal.

7. A device for producing electromagnetic radiation by stimulated emission comprising
   means for producing and directing an energy beam of a predetermined incident intensity along a predetermined path; and
   a zinc oxide single crystal having a power conversion efficiency of greater than about $10^{-2}$ percent being disposed in said path to intercept said energy beam, said crystal being responsive to being bombarded by said energy beam to produce an output of electromagnetic radiation containing an emission line which exhibits both line narrowing and a superlinear dependence on the incident intensity of said energy beam.

8. An electron beam pumped laser comprising
   means for producing and directing an electron beam of a predetermined voltage and current density along a predetermined path; and
   a zinc oxide single crystal formed in a Fabry-Perot cavity and disposed in said path to intercept said electron beam, said zinc oxide crystal having a power conversion efficiency of greater than about $10^{-2}$ percent and being disposed relative to said predetermined path such that when said crystal is bombarded by said electron beam said crystal produces ultraviolet radiation from said cavity by stimulated emission.

9. An electron beam pumped laser for producing coherent ultraviolet radiation comprising
   a zinc oxide single crystal formed in a resonant cavity and having a power conversion efficiency of greater than about $10^{-2}$ percent, said crystal being capable of being pumped by an electron beam of a predetermined voltage and current density to cause stimulated emission in said crystal producing coherent ultraviolet radiation; and means for bombarding said crystal with an electron beam of a predetermined voltage and current density to pump said crystal into stimulated emission producing said coherent ultraviolet radiation.

10. The electron beam pumped laser of claim 9 further including means for varying the ambient temperature of said crystal.

11. The apparatus of claim 1 wherein the pair of cleaved faces of the crystal are coated with a reflective coating.

12. The apparatus of claim 1 or 2 further including means for cooling the crystal to a predetermined ambient temperature.

13. Apparatus for producing electromagnetic radiation from a crystal comprising:

a zinc oxide single crystal in the form of a wafer sliced from a bulk crystal having a low level of impurities as measured in parts per million, the wafer having a pair of reflective coated spaced parallel cleaved faces which form a cavity and having a pair of major surfaces substantially normal to the cleaved faces, one of the cleaved faces being coated to a higher degree of reflectivity than the other and one of the major surfaces being a relatively smooth optically flat surface and being substantially normal to the bulk crystal c-axis;

means for exciting the crystal to produce to produce electromagnetic radiation from the cleaved face having the lesser reflective coating by directing a source of energy of at least a predetermined incident intensity at the optically flat major surface; and means for cooling the crystal to a predetermined ambient temperature.

References Cited

F. H. Nicoll, "Ultraviolet ZnO Laser Pumped By An Electron Beam," Applied Physics Letters, vol. 9, July 1, 1966, pp. 13–15. (331–94.5.)

ROY LAKE, Primary Examiner

S. H. GRIMM, Assistant Examiner

U.S. Cl. X.R.

330—4.3